Nov. 3, 1970 L. A. BLANCHARD, JR 3,537,270
NATURAL GAS DEHYDRATION
Filed Sept. 7, 1967

INVENTOR
LOUIS A. BLANCHARD, JR.
BY C. J. Tonkin
ATTORNEYS

United States Patent Office 3,537,270
Patented Nov. 3, 1970

1

3,537,270
NATURAL GAS DEHYDRATION
Louis A. Blanchard, Jr., Snyder, Tex., assignor to Chevron Research Company, San Francisco, Calif., a corporation of Delaware
Continuation-in-part of application Ser. No. 543,499, Apr. 11, 1966. This application Sept. 7, 1967, Ser. No. 666,202
Int. Cl. F25j 3/08
U.S. Cl. 62—12                        9 Claims

ABSTRACT OF THE DISCLOSURE

Process for dehydrating high pressure gas which comprises: flashing the high pressure gas into a first vessel to obtain a low pressure gas of reduced water content; heating the low pressure gas by heat exchange with the high pressure gas; and melting hydrates formed in the first vessel upon flashing the high pressure gas, using as a heating medium the heated low pressure gas.

CROSS REFERENCES

Figure 1:
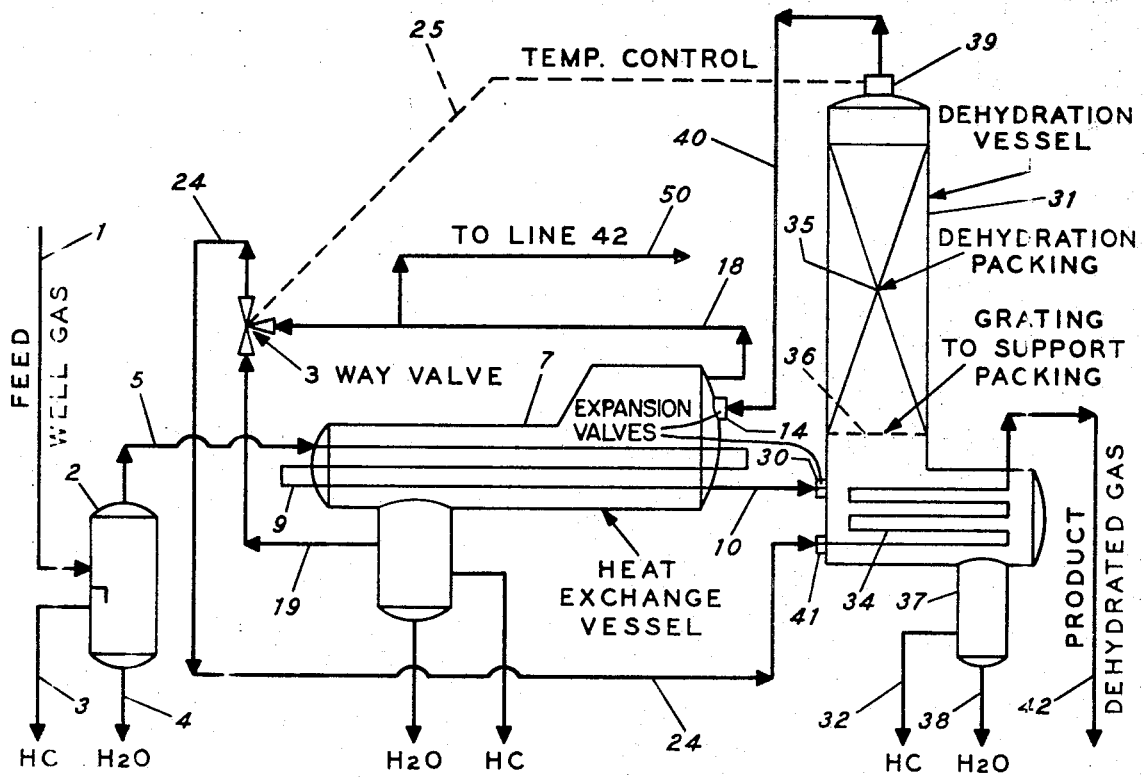

This application is a continuation-in-part of application Ser. No. 543,499, filed Apr. 11, 1966, and now abandoned.

BACKGROUND OF THE INVENTION

Field of the invention

This invention relates to a new method for the recovery of moisture and hydrocarbon liquids occurring in natural gas streams. The invention is particularly concerned with low temperature separation systems for high pressure well streams wherein the well stream is caused to undergo a temperature reduction by means of a pressure drop or other suitable means for cooling, followed by resolution of the chilled gas stream into its water, oil and gas components and heating to melt any gas hydrates or ice particles which may be present, as well as to effect a degree of stabilization or rectification of the separated oil or distillate.

Prior art

In the high pressure gas streams, as they flow from the earth, there is a considerable quantity of water, water vapor, and condensable hydrocarbons. If such a stream is passed directly into the gas lines, there will be some hydrocarbon condensation. Also, some of the water will condense and result in hydrate formation. In the gas line this will interfere with valve operation and also reduce the amount of gas which can flow through the line.

It is known that this hydrate formation occurs as a result of lowering of the pressure and the reduction of the temperature. More accurately, when there is a reduction in pressure, a corresponding drop in temperature occurs which causes water condensation; and, as a result, gas hydrates are formed. In the past, knockout chambers have been used near the well in order to remove liquids that have condensed as the gas comes to the surface. This has not usually been sufficient to provide a gas stream which has a low enough moisture content for supply to long transmission lines.

The well stream as it is dehydrated according to prior processes using more than a mere knockout chamber is first conducted (i.e., before dehydration) through a coil submerged in liquid hydrocarbons and/or water in the bottom of the dehydrating vessel. The cooled, high pressure well gas is later flashed (i.e., pressure is rapidly reduced) into the dehydrating vessel causing hydrates to form and hydrocarbons to condense because of the drop

2 in temperature. In this mode of operation the bottom of the dehydrating vessel must necessarily be kept warm and usually above the hydrate forming temperature of the high pressure well gas in the coil. For a .7 specific gravity gas at 3,000 p.s.i., the gas in the coil must be kept at approximately 74° F. or higher (generally in actual field operation, temperatures in the bottom of the dehydrating vessel are about 80–95° F.) or hydrates will form and plug the coil forcing the operation to be temporarily discontinued.

It has been proposed to operate the water strata in low temperature separators (dehydrating vessels) at low temperatures—i.e., below 80–90° F.—using controlled amounts of steam to supply heat to the bottom contents of the vessel. This is not a wholly satisfactory solution because of added investment and operating costs.

SUMMARY OF THE INVENTION

According to the present invention, in a process for dehydrating high pressure petroleum well streams wherein high pressure, warm well gas is heat exchanged with expanded low pressure, cold well gas, the improvement is made which comprises: (1) cooling the warm, high pressure well gas in a heat exchange vessel, using a dehydrated, cold, low pressure well gas, to obtain cooled, high pressure well gas; (2) flashing the cooled, high pressure well gas into a dehydrating vessel to obtain cold, low pressure well gas; (3) controlling the amount of heat removed from the warm, high pressure well gas in the heat exchange vessel by the dehydrated, cold, low pressure well gas by using two flow paths for the dehydrated, cold, low pressure well gas through the heat exchange vessel; (4) withdrawing dehydrated, cold, low pressure well gas from the heat exchange vessel through two different outlets; and (5) melting hydrates formed upon flashing the cooled, high pressure well gas into the dehydrating vessel using heat from the dehydrated, cold, low pressure well gas after the dehydrated, cold, low pressure well gas has removed heat from the warm, high pressure well gas in the heat exchange vessel.

Through use of a dehydration step before gases are passed through the coil, or other heating means used to melt hydrates formed upon flashing, a much lower temperature is attained in the bottom of the vessel into which the cooled, high pressure well gas is flashed. According to previously used processes, a warm bottom was necessary in the flash vessel because the heating means was not dehydrated and, therefore, was subject to plugging if temperatures below about 65–85° F. were used in the bottom of the flash vessel. This is one of the problems overcome by the present invention as in the present invention the high pressure well gas is flashed into a vessel (herein generally called the dehydration vessel) and the relatively dry, cold gases leaving the upper part of the dehydration vessel are passed via two flow paths through a heat exchange vessel so as to be heated a controlled amount and then passed in a coil through the bottom of the dehydration vessel thus providing low temperature heat to melt hydrates formed upon flashing the high pressure well gas into the dehydration vessel. Because of the two flow paths provided for the expanded gas through the heat exchange vessel, the temperature may be controlled in the dehydrating vessel so as to optimize the amount of liquid hydrocarbons removed upon flashing into the dehydration vessel. The pressure inside the dehydrating vessel can also be more readily controlled. Optimum pressure and temperature can be used for dehydration and liquid recovery.

In one preferred embodiment of the invention, there is no contact of the well gas with a solid, desiccant substance. Dehydration is obtained entirely as a result of low temperature obtained in flashing the well gas, which low temperature causes water to condense and form a separable liquid phase. Liquid hydrocarbons are also condensed due to the lowering of the temperature and also, in the case of many well gases, due to retrograde condensation (discussed herein below in more detail) resulting upon lowering the pressure. In the overall process of this invention, the vessel into which the high pressure well gas is first flashed is called the dehydration vessel whether or not a solid, desiccant substance is contained therein.

However, in a more preferred embodiment of the overall process of the subject invention, a solid, desiccant substance is contained in the dehydration vessel. Thus, when the high pressure well gas is flashed into the dehydration vessel, the cold, low pressure gas will be further dehydrated in passing upward through the desiccant, which desiccant is preferably particles of calcium chloride. As the cold, low pressure gas moves upward through the calcium chloride, the calcium chloride becomes moist and a brine (aqueous solution of calcium chloride) drips downward. This is of particular advantage in the present invention as the brine aids in melting the hydrates formed upon flashing the high pressure well gas into the dehydration vessel.

As mentioned above, an important aspect of the overall process is the provision of two flow paths for cold, dry gas through the heat exchange vessel after the dehydrating vessel. In most instances, the largest pressure drop will be the flash of the high pressure well gas into the dehydrating vessel. However, in some instances, a considerable pressure drop is advantageously also taken by flashing the gas from the dehydrating vessel into the heat exchange vessel. Because two flow paths are provided for the cold, dry gas from the dehydrating vessel, this second flash can be used to improve still further the recovery of moisture and liquid hydrocarbons from the well gas. By allowing only a relatively small amount of the gas which is flashed into the heat exchange vessel to flow along a lower path, the high pressure nondehydrated well gas flowing through the coil in the heat exchange vessel is not cooled so severely as to form hydrates inside the coil and plug the coil. However, any hydrates formed outside the coil upon flashing the dry, low pressure gas into the heat exchange vessel are melted by heat from the warm, high pressure gas inside the coil. A minimum of heat can be used to melt the hydrates because no liquids need be maintained in the melting section. The coils in the heat exchanger are so placed as to prevent solid hydrates from passing through the coils. Other means, such as metal balls, may be introduced into heat exchanger to prevent the passage of solid hydrates.

Thus one important inventive aspect of the overall process centers upon the heat exchange vessel. Furthermore, the heat exchange vessel may be used separately from the overall process. In such use, high pressure well gas is first passed through the heat exchange vessel in a coil or other conduit means and then flashed into the upper part of the heat exchange vessel. Hydrates formed upon flashing fall downward and are melted by the heat from the warm, high pressure gas passing through the coil. Low pressure dehydrated gas is withdrawn from the top of the heat exchange vessel, after turning 180° in a vertical plane with respect to the inlet high pressure gas to reduce entrainment of hydrates and/or liquid hydrocarbons resulting from expanding the high pressure gas. A temperature-controlled amount of gas is also withdrawn from the lower part of the heat exchange vessel. The amount of expanded well gas withdrawn from the lower part of the heat exchange vessel is readily used to control temperature in the upper part of the heat exchange vessel as the expanded gas which flows along the lower path travels over a large area of the coil through which the warm, high pressure well gas is conducted.

DETAILED DESCRIPTION OF THE DRAWINGS

Referring now to FIG. 1, feed well gas in line 1 is introduced to separator vessel 2 and liquid hydrocarbons are withdrawn from line 3 and water in line 4. For a specific example, this feed gas is one with a flowing pressure of 4,000 p.s.i.g. and a temperature of 130° F. The high pressure gas withdrawn from the top of separator vessel 2 in line 5 is passed through heat exchange vessel 7 via coil 9. After passing through coil 9, cooled, high pressure well gas at 85° F., which is 5° F. above hydrate formation temperautre for the example feed gas, is withdrawn in line 10 and passed through choke or valve 30 into dehydration vessel 31. Hydrates are formed when the high pressure gas is expanded across choke or valve 30 with a reduction in pressure of 2,000 p.s.i. The resulting temperature is 45° F. For a case in which there is no dehydration packing 35, the gas is dehydrated to 7 pounds water per million cubic feet of gas at 2,000 p.s.i.g. and 45° F.; i.e., actual temperature and pressure. Some liquid hydrocarbons will form due to retrograde condensation and/or temperature reduction occurring across valve 30. These liquid hydrocarbons are withdrawn in line 32. The hydrates which form fall downward and are melted with dehydrated, low pressure gas in coil 34.

If the well gas is at pressure substantially lower than 4,000 p.s.i.g., then dehydration packing in vessel 31 becomes more desirable. The dehydration packing 35 shown in FIG. 1 may be any of the commonly used solid desiccants or dehydrating substances, such as calcium chloride. In this process, calcium chloride is a preferred dehydrating substance. As the water-containing gaseous stream passes upward through the dehydration packing, water is removed and an aqueous solution of calcium chloride drips down through grating 36 which is used to support the dehydration packing. Since the brine has a freezing temperature considerably below that of pure water, it is conducive to melting any hydrates formed outside of coil 34 and/or in the bottom of the dehydration vessel as a result of the high pressure well gas flashed across valve 30. It is important, however, that at least about 63 percent water be maintained in the aqueous phase in the low part of dehydration vessel 31, particularly in boot 37, because lower amounts of water with calcium chloride result in the freezing point of the brine being above 32° F. Preferably the water concentration is kept between 70 and 99.5 percent, generally about 90-98 percent. Brine solution is removed from the dehydration vessel via line 38. Gaseous hydrocarbons are removed from the dehydration vessel via line 40 after passing through temperature control valve 39.

The dehydrated, low pressure well gas is then passed via control and/or expansion valve 14 into heat exchange vessel 7 and flows along two flow paths as described in more detail below with respect to FIG. 1. However, in this instance, it has been found advantageous to control the amount of expanded well gas flowing along the respective flow paths through heat exchange vessel 7 in response to temperature sensed in the top of dehydration vessel 31 as is indicated by line 25. Alternatively, the flow of expanded gases through each of the paths in vessel 7 may be in response to temperature of the water in line 38, keeping the water just above the freezing temperature.

Referring once again to the specific example of feed gas entering at 4,000 p.s.i.g. which is flashed to 2,000 p.s.i.g. and 45° F. in dehydration vessel 31, this gas is heated from about 45° F. to about 90° F. in line 24 by exchange with high pressure gas in heat exchange vessel 7. Product dehydration gas withdrawn from the three-way valve in line 24 is passed through control valve 41 and into coil 34 in the lower part of dehydration vessel 31 where it melts hydrates formed upon rapidly expanding high pressure gas into dehydration vessel 31. The product dehydrated gas is withdrawn in line 42 and passed to further processing, such as removal of propane and/or butane by a gas plant, or passed directly to a gas transmission line.

Bypass line 50 is used primarily for that mode of operation of the process schematically illustrated in FIG. 1 when there is considerable pressure drop across both valves 30 and 14. In this instance there is provided a very efficient means for obtaining very dry gas while achieving high liquid hydrocarbon recovery. The hydrates which form due to expansion across valve 14 are melted by heat from coil 9. Because the gas flowing along the upper flow path in heat exchange vessel 7 (line 18) is considerably cooler than the gas flowing along the lower flow path (line 19), it is advantageous to use mostly gas from line 19 to supply heat in coil 34 to melt hydrates formed upon flashing across valve 30. Line 50 will necessarily require a means of controlling the rate through line 50 to line 42. This rate can easily be controlled by a valve or choke in line 50. Also a four-way valve can be used instead of a three-way valve.

To avoid plugging of valves 14 and 30 in cold climates, it may be necessary to insulate the lines leading to the valve. In general, the material entering the valve must be warm enough to be at or above the dew point, or above hydrate temperature, otherwise provision should be made to supply some local heat to the valve to avoid valve plugging. To avoid plugging valve 30, in the case of some well gases, it may be desirous to install vessel 2 between heat exchanger 7 and dehydrating vessel 31 in line 10. Vessel 2 will then be available to remove any additional free water caused by cooling of the high pressure well gas in heat exchange vessel 7.

Figure 2:
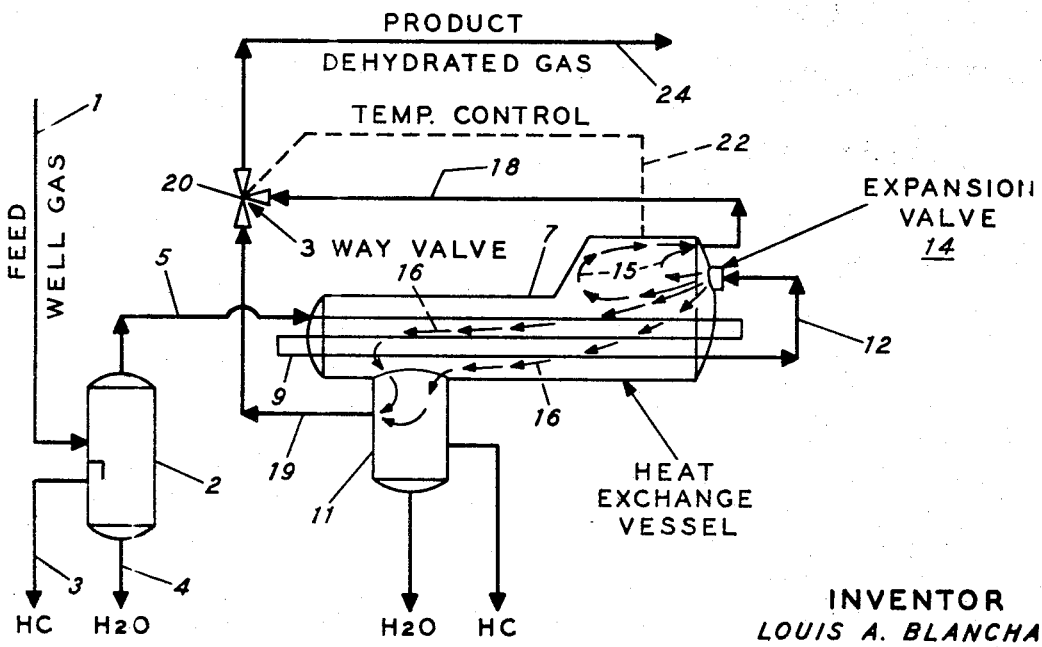

Referring now to FIG. 2, feed gas at a pressure of above 1,000 p.s.i.g., generally between about 10,000 to 2,500 p.s.i.g., enters in line 1 and is passed into knockout vessel 2. Liquid hydrocarbons are withdrawn from the vessel in stream 3 and liquid water in stream 4. The high pressure well gas generally at about 80° F. to 160° F. is withdrawn from the top of separator vessel 2 via line 5 and passed into heat exchanger vessel 7 so that hydrate chunks and particles which form after the material is flashed through expansion valve 14 will fall onto the coil and be melted so that they may be withdrawn as water from boot 11. The coils are so placed as to catch solid hydrates and melt them. The high pressure gas passing through coil 9 is cooled to about 70° F. to 120° F. to result in a cooled, high pressure gas as in line 12. This cooled high pressure gas at 70° F. to 120° F. is flashed through expansion valve 14 with a pressure drop of between 500 and 6,000 p.s.i. To avoid plugging expansion valve 14, it may be desirous to install vessel 2 between heat exchanger 7 and line 12. Line 12 should normally be above hydrate temperature or above dew point temperature. The dew point temperature can be lowered by removing free water and condensate caused by cooling line 12 through heat exchanger 7. This lowering of the pressure through expansion valve 14 results in substantial cooling of the gas causing hydrates to form. These hydrates are generally white and crystalline in appearance. These hydrates consist of associated solid $H_2O$ and hydrocarbons, such as methane, ethane, propane or butane. The hydrates are formed at temperatures as high as 90 to 100° F. but more frequently at about 55 to 80° F. These hydrates are caught by the coils and melted.

Liquid hydrocarbons also form when the material is flashed through exchange valve 14. The formation of these liquid hydrocarbons is due to two phenomena: (1) condensation due to a lowering of temperature of the gas, and (2) retrograde condensation that occurs in the case of certain well gases which are taken from the ground at conditions above the critical temperature and pressure. Retrograde condensation has been defined as the phenomena of liquid formation by isothermal expansion of a single phase fluid, p. 80 of Katz et al., "Handbook of Natural Gas Engineering," McGraw-Hill, 1959. Other authors have described retrograde condensation as that condensation in which liquid is condensed upon either lowering pressure at constant temperature or increasing temperature at constant pressure. An excellent discussion is given in Katz et al. of retrograde phenomena at pp. 77–81. Katz et al. also present a discussion of optimum pressure and temperature for maximum moisture and liquid hydrocarbons recovery from high pressure well gases at pp. 507–512. The disclosure of the cited Katz et al. reference is incorporated by reference into this specification.

In accordance with an inventive aspect of the overall process, two flow paths are provided in heat exchanger 7 for the material that is flashed through expansion valve 14. Schematically, one of the flow paths is indicated by dotted line 15. Material flowing along this upper flow path has little cooling effect upon the warm, high pressure gas flowing through coil 9. Material flowing along a lower path indicated schematically by dotted line 16 comes into much greater contact with coil 9; and, due to the fact that it passes over much more heat exchange area, the expanded gases which travel along flow path 16 remove much more heat from the high pressure well gas. Material passing along the upper flow path schematically indicated by dotted line 15 is withdrawn in line 18 and passed to three-way valve 20. Expanded gases passing along the lower flow path 16 are withdrawn in line 19 and passed to three-way valve 20. The respective rates of withdrawal in lines 18 and 19 are controlled by the three-way valve 20 which in turn is controlled according to temperature sensed in heat exchanger vessel 7 as is indicated by line 22. The product dehydrated gas is withdrawn in line 24.

Although various specific embodiments of the invention have been described and shown, it is to be understood that they are meant to be illustrative only and not limiting. Certain features may be changed without departing from the spirit or essence of the invention. It is apparent that the invention has broad application to the dehydration and separation of liquid hydrocarbons from high pressure hydrocarbon gas streams. Accordingly, the invention is not to be construed as limited to the specific embodiments illustrated but only as defined in the following claims.

I claim:

1. In a process for dehydrating high pressure well gas streams wherein high pressure warm well gas after flowing through a coil in a heat exchange vessel is expanded to obtain low pressure cold well gas which low pressure cold well gas is heat exchanged with said high pressure warm well gas while in surrounding relation to the coil, the improvement which comprises:
    (1) controlling the mount of heat removed from the high pressure warm well gas by flowing the low pressure cold well gas continuously along two flow paths through the heat exchange vessel to obtain cooled high pressure wall gas;
    (2) flashing the cooled high pressure well gas into the heat exchange vessel;
    (3) melting hydrates formed upon flashing the cooled high pressure well gas into the heat exchange vessel using heat from the high pressure warm well gas; and
    (4) withdrawing dehydrated gaseous hydrocarbons from the heat exchange vessel through two different outlets, one outlet located above the expansion valve and the other outlet located below the expansion valve said other outlet being located below the heat exchange coil, and the expansion valve being located above the exchange coil.

2. Process as in claim 1 wherein the flow paths are an upper and lower flow path, the lower flow path passing over more heat exchange area in the heat exchange vessel so as to remove more heat from the warm high pressure well gas.

3. Process as in claim 1 wherein the gaseous hydrocarbons from each of the respective flow paths through the heat exchange vessel are routed to respective inlets of a three-way valve and wherein the respective inlets to the three-way valve are adjusted for flow rate in response to temperature of the heat exchange vessel thereby controlling the temperature in the heat exchange vessel by controlling the flow through each of the flow paths.

4. Process as in claim 3 wherein gaseous hydrocarbons leaving the heat exchange vessel via the upper flow path are required to make a 180-degree turn with respect to the high pressure cooled well gas inlet into the heat exchange vessel before leaving the heat exchange vessel.

5. Process as in claim 1 wherein the gaseous hydrocarbons from the upper flow path are withdrawn as a cold dehydrated gas and gaseous hydrocarbons from the lower flow path are withdrawn as warm gas and used to melt hydrates formed upon reducing pressure on the high pressure well gas prior to flashing the cooled high pressure well gas into the heat exchange vessel.

6. In a process for dehydrating high pressure well gas streams wherein warm high pressure well gas after flowing through a coil is expanded to obtain low pressure cold well gas, which low pressure cold well gas is heat exchanged with said high pressure warm well gas while in surrounding relation to the coil, the improvement which comprises:
   (1) cooling the warm high pressure well gas in a heat exchange vessel, using a dehydrated cold low pressure well gas obtained as described in step (2), to obtain cooled high pressure well gas;
   (2) flashing the cooled high pressure well gas into a dehydrating vessel to obtain the dehydrated cold low pressure well gas;
   (3) controlling the amount of heat removed from the warm high pressure well gas in the heat exchange vessel by the dehydrated cold low pressure well gas by using two flow paths for the dehydrated cold low pressure well gas through the heat exchange vessel;
   (4) continuously withdrawing dehydrated cold low pressure well gas from the heat exchange vessel through two different outlets, one outlet located above the expansion valve and the other outlet located below the expansion valve, and said other outlet located below the heat exchange coil, the expansion valve being above the exchange coil; and
   (5) melting hydrates formed upon flashing the cooled high pressure well gas into the dehydrating vessel using heat from the dehydrated cold low pressure well gas after the dehydrated cold low pressure well gas has removed heat from the warm high pressure well gas in the heat exchange vessel.

7. Process as in claim 6 wherein the flow paths are an upper and lower flow path, the lower flow path passing over more heat exchange area in the heat exchange vessel so as to remove more heat from the warm high pressure well gas.

8. Process as in claim 6 wherein the gaseous hydrocarbons from each of the respective flow paths through the heat exchange vessel are routed to respective inlets of a three-way valve and wherein the respective inlets to the three-way valve are adjusted for flow rate in response to temperature of the heat exchange vessel thereby controlling the temperature in the heat exchange vessel by controlling the flow through each of the flow paths.

9. Process as in claim 6 wherein the dehydrated cold low pressure well gas is also flashed into the heat exchange vessel and hydrates formed from such additional flash are melted by warm high pressure well gas passed through the heat exchange vessel.

References Cited
UNITED STATES PATENTS

| | | | |
|---|---|---|---|
| 2,665,565 | 1/1954 | Parks | 62—20 |
| 2,671,322 | 3/1954 | Barry | 62—20 |
| 3,003,007 | 10/1961 | Newsome | 62—12 |
| 3,254,497 | 6/1966 | Henry et al. | 62—12 |

NORMAN YUDKOFF, Primary Examiner

A. F. PURCELL, Assistant Examiner

U.S. Cl. X.R.

55—57; 62—23